(12) United States Patent
Giacomini

(10) Patent No.: US 6,777,840 B2
(45) Date of Patent: Aug. 17, 2004

(54) VALVE ACTUATOR FOR WATER HEATING/COOLING AND SANITARY SYSTEMS

(75) Inventor: Luca Giacomini, Madonna del Sasso (IT)

(73) Assignee: Giacomini S.p.A., S. Maurizio d'Opaglio (IT)

( * ) Notice: Subject to any disclaimer, the term of this patent is extended or adjusted under 35 U.S.C. 154(b) by 0 days.

(21) Appl. No.: 09/980,830

(22) PCT Filed: Apr. 6, 2001

(86) PCT No.: PCT/EP01/03918

§ 371 (c)(1),
(2), (4) Date: Mar. 25, 2002

(87) PCT Pub. No.: WO01/77559

PCT Pub. Date: Oct. 18, 2001

(65) Prior Publication Data

US 2002/0115515 A1 Aug. 22, 2002

(51) Int. Cl.[7] .......................... H02K 7/10; F16K 31/04
(52) U.S. Cl. ...................... 310/83; 310/96; 137/596.17; 137/625.25; 251/129.12
(58) Field of Search ................................ 310/75 R, 80, 310/83, 92, 96, 98, 99; 74/89.14; 137/596.17, 625.25; 251/129.11, 129.12

(56) References Cited

U.S. PATENT DOCUMENTS

| | | | | |
|---|---|---|---|---|
| 2,978,219 A | * | 4/1961 | Bigelow et al. | 251/81 |
| 4,416,644 A | * | 11/1983 | Kulischenko et al. | 464/52 |
| 4,616,528 A | * | 10/1986 | Malinski et al. | 475/4 |
| 4,641,887 A | * | 2/1987 | Klueting | 297/362 |
| 5,223,822 A | * | 6/1993 | Stommes et al. | 137/551 |
| 5,444,309 A | * | 8/1995 | Innes et al. | 307/125 |
| 6,053,834 A | * | 4/2000 | Savoyard et al. | 475/145 |
| 6,276,664 B1 | * | 8/2001 | Keller | 251/129.12 |

* cited by examiner

Primary Examiner—Thanh Lam
Assistant Examiner—Judson H. Jones
(74) Attorney, Agent, or Firm—Young & Thompson

(57) ABSTRACT

An improved actuator (1) for water heating/cooling and sanitary systems includes a miniaturized D.C. Motor (2) with a mechanical clutch element (4), a first motor reducing unit (6) including a planetary reducing unit with a high gear ratio, a second reducing unit (14) for transforming a rotary movement into a reciprocating axial movement, and a supporting framework (29, 7, 9, 26) for supporting the components, and an electronic card (37) for controlling and driving the motor (2). A plurality of coupling adapters (33) allow the improved actuator (1) to be coupled to manifolds of different manufacturers.

12 Claims, 3 Drawing Sheets

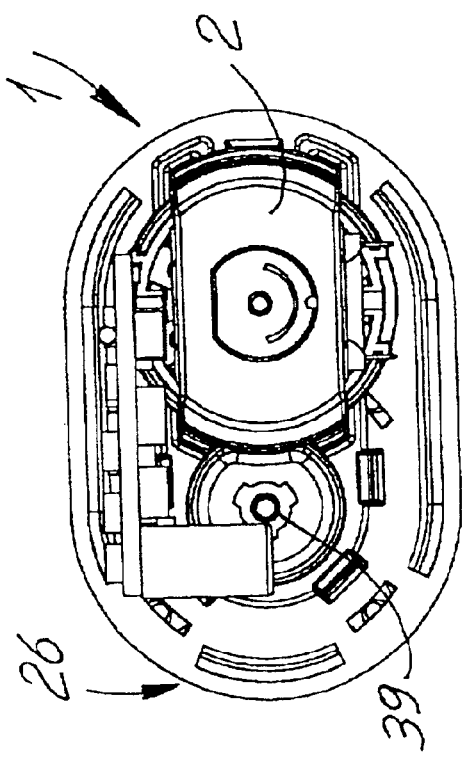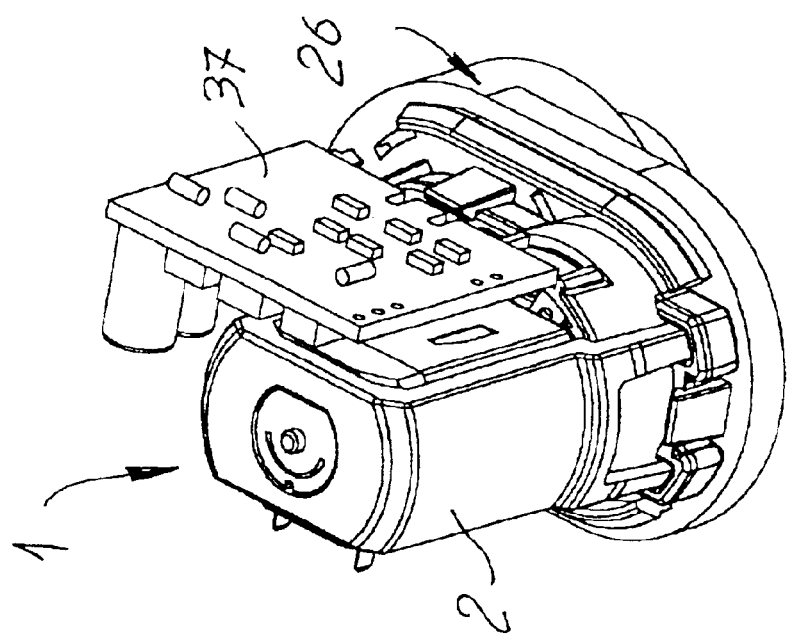

VALVE ACTUATOR FOR WATER HEATING/COOLING AND SANITARY SYSTEMS

BACKGROUND OF THE INVENTION

The present invention relates to an improved actuator for water heating/cooling and sanitary systems, according to the preamble of claim 1.

In the heating and sanitary system field, so-called "thermoelectric" shutters, including a substantially thermoexpansible element, for example a wax capsule which, as it passes from a solid to a molten status thereof, upon a heating operation, expands to cause a valve, manifold or the like shutter, to be driven from a closing position to an open position and vice-versa are already known.

Said prior thermoelectric actuators have, due to a corresponding small size of their expanding material capsules, a small size, thereby they can be assembled both on individual components, such as valves, and on manifolds including a plurality of shutters typically spaced with a pitch of or less than 50 mm.

However, while said prior actuators reliably operate in their opening/closing operations, they are affected by several drawbacks and disadvantages. At first, their shutter can be exclusively driven to open/closed positions, thereby preventing a continuous adjustment of the flow rate through the circuit coupled to said shutter. This would involve a low operating efficiency, for example in water heating/cooling systems, with a consequent large power consume and heating cost.

In fact, a single opening/closing mode of operation; cannot provide an optimal adjustment, for example, of the water heating/cooling system to provide said system with the required operating flexibility, as could be achieved by modern available digital technologies, such as fuzzy logic, autotuning, and so on techniques.

Moreover, the heating of the wax material melting resistive element, requires a comparatively great current drain: for example, a manifold including 15 actuators would require a comparatively high power consume and related cost, and a wiring including wires having a correspondingly large cross-section.

A further drawback of prior thermoelectric actuators is that they have a comparatively long switching on time, thereby a large electric power is consumed for heating and melting the wax material. In particular, after a long off period, for example at the start of the heating/cooling season, said switching on time would amount to 8–10 minutes, whereas, in the operation of the heating/cooling system, this time would amount to 4–5 minutes, with great variations depending on the environment conditions. Since the power drain of a prior thermoelectric actuator is of about 5W, and since, for multiple actuators, for example 15 and more in manifold arrangements, said power drain proportionately increases, said prior thermoelectric actuators cannot be battery power supplied. Furthermore, said prior actuators must overcome the overlapping shutter resilient forces, for example of 15 Kg, thereby preventing said prior thermoelectric actuators from being replaced by newly designed low cost actuators, suitable to replace said prior thermoelectric actuators, which are large series products.

For larger size circuit valves, i.e. for comparatively large flow-rate circuits, so-called "electric" actuators are moreover known, which comprise an electric motor, such as a synchronous motor or a step motor, which electric actuators, however, have a large size and a great electric drain, a motor-reducing unit being sometimes arranged between their motor and shutter. The overall size of this prior electric actuators, on the other hand, is comparatively large, thereby they cannot be properly miniaturized to efficiently replace said prior thermoelectric actuators.

Furthermore, the electric actuators comprise many components and have a rater high cost; thus they cannot be used in water heating/cooling and sanitary system manifolds including spaced-apart shutters; this increased size, moreover, would negatively affect the installation of the mentioned components.

While the requirement of replacing prior thermoelectric actuators by other types of actuators allowing a continuous adjustment of the driven shutter controlled flow rate, while providing a less switch-on time, is well known in this field since 20 years, alternative actuators suitable to meet the above mentioned requirements have not been yet provided.

SUMMARY OF THE INVENTION

Accordingly, the aim of the present invention is to provide an improved actuator, of the above mentioned type, which, on a side, is free of the drawbacks and disadvantages of prior actuators and, on the other side, allows to perform a continuous adjustment of the shutter movement or stroke, while providing a very reduced switch-on time and electric drain.

Within the scope of the above mentioned aim, a main object of the present invention is to provide such an actuator construction which is very reliable in operation and has a long life, and can be made at a cost substantially like that of prior thermoelectric actuators.

According to one aspect of the present invention, the above mentioned aim and objects, as well as yet other objects, which will become more apparent hereinafter, are achieved by an improved actuator for water heating/cooling and sanitary systems, having the features of claim 1.

Further improvements and advantageous embodiments are defined in the dependent claims.

The improved actuators according to the invention provide a lot of advantages. The use of a D.C. motor provides an optimum size/torque ratio, with a time consistent operation fully independent from the environment conditions. Moreover, since miniaturized D.C. low power motors, like those provided by the invention, are at present used in a very large series in the motor vehicle industry, they can be made at a very low cost. The high RPM of the D.C. motors is advantageously herein greatly reduced by a reducing unit which can be easily made from plastics materials, is noiseless and provides a reduction larger than 1000 with its diameter less than 15 mm, i.e. substantially equal to the diameter of a suitable miniaturized D.C. motor, thereby providing the desired and necessary small size for assembling on conventional manifolds having shutter pitches less than 50 mm. A further advantage is that of transforming, by a worm screw, the rotary movement of a planetary reducing unit into an axial reciprocating movement thereof, thereby further increasing the reduction ratio, on a side, and allowing said actuator, on the other side, to reliably drive shutters requiring high driving forces, for example larger than 15 Kg. A further advantage of the above mentioned miniaturized D.C. motors is the very low power drained thereby, of about 8 times less than that of prior thermoelectric actuators, affected by the above mentioned limits. This low consume feature, in addition to being advantageous from the power drain aspect, makes the actuator driven by a miniaturized D.C. motor very suitable for battery power supply arrangements.

Yet another advantage of the improved actuators according to the present invention is that, by properly adjusting the shutter displacement, it is possible, by using known digital timing methods, to provide very high efficiency heating/cooling systems, depending on the user requirements, through the overall operation day. The required displacement or stroke variations are achieved in a very short time and reliable manner, in opposition to a 4–5 minute opening/closing switching time of prior thermoelectric actuators, and with an operation which is fully independent from the contingent requirement conditions. Moreover, the power drain is further limited by the fact that the switching on time of the motors can be reliably controlled by an easily constructed electronic card. Yet another advantage is that the invention uses a mechanical clutch preventing the motors from locking at their end of stroke positions, which, together with a reliable timing by the control electronics, provides the actuator with a long operating life, i.e. greater than 10 years. A further advantage is that the provided planetary reducing unit can be assembled in an automatic manner, thereby reducing the assembling time and, accordingly, the overall making cost. Yet another advantage is that a plurality of adapters are provided, allowing to assemble a respective actuator according to the invention on different types of existing manifolds.

BRIEF DESCRIPTION OF THE DRAWINGS

Further characteristics, advantages and details of the improved actuator according to the present invention will become more apparent from the following disclosure with reference to the accompanying drawings, in which a preferred embodiment of the actuator according to the present invention, provided by a merely indicative example, is illustrated. In the drawings:

FIG. 4 is a top plan view of the actuator;

FIG. 5 is a perspective view of the improved assembled actuator, in which, for simplicity, the, cap covering the actuator according to the invention has been shown by the dash-dot line only in FIG. 2.

DESCRIPTION OF THE PREFERRED EMBODIMENT

In the figures, like parts have been indicated by like reference numbers.

Figure 1:
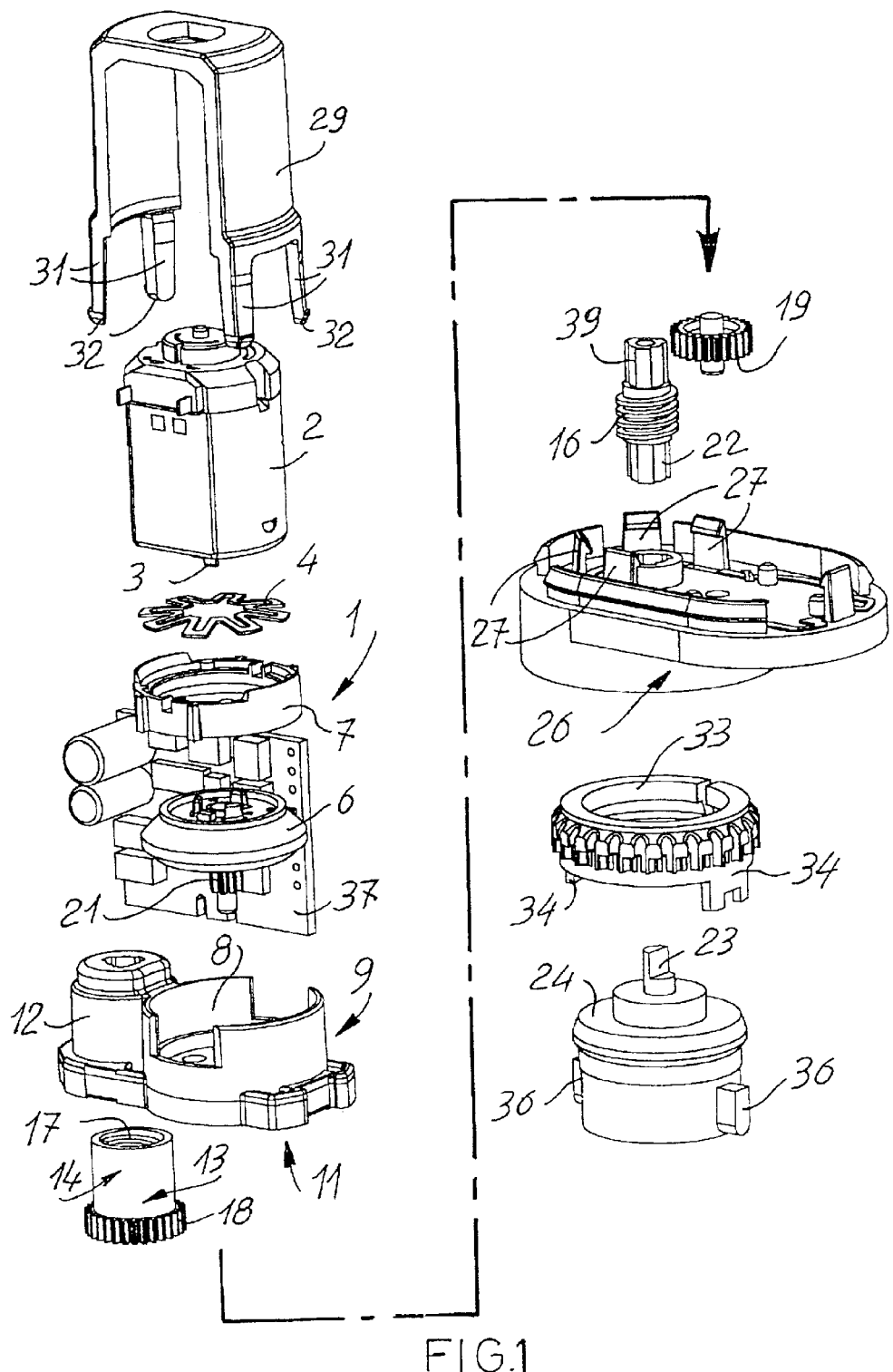
FIG. 1 is an exploded view of the main components of the improved actuator according to the invention.
Figure 3:
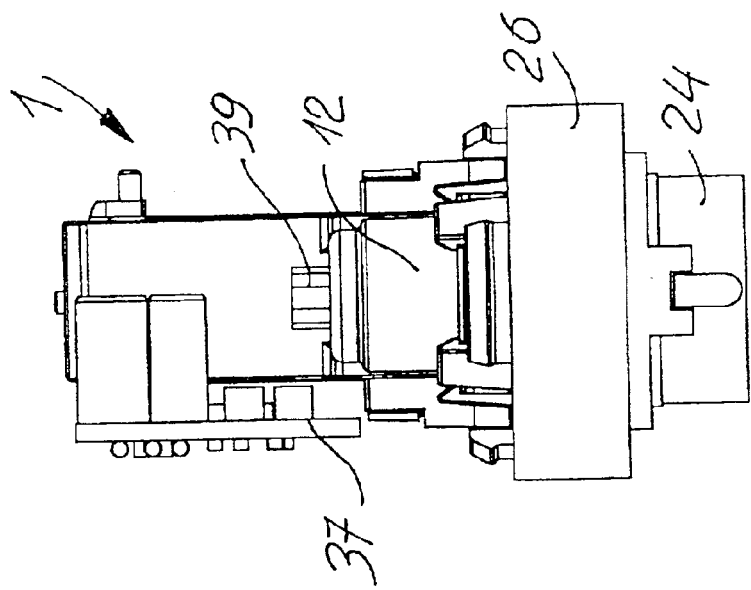
FIG. 3 is a front view of the actuator.
Figure 2:
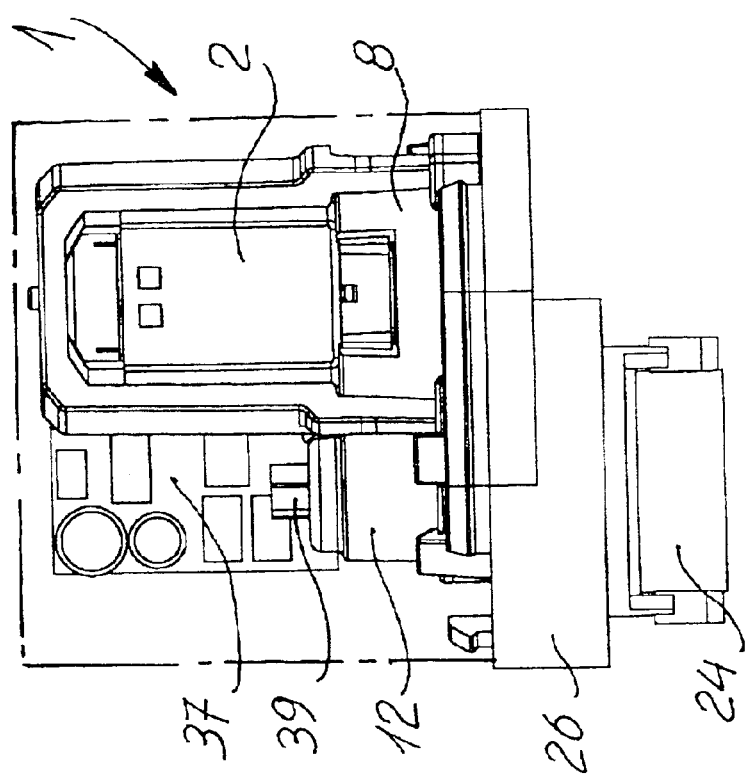
FIG. 2 is a side elevation view of the improved actuator of FIG. 1, in an assembled condition.

With reference at first to FIG. 1, the improved actuator according to the present invention has been generally indicated by 1. The actuator 1 comprises, housed in a framework construction to be disclosed in a more detailed manner hereinafter, an electric motor 2 which, according to the invention, is a miniaturized D.C. motor, of a power less than 1 Watt, for example of a type used in the motor vehicle field, for operating, for example, rear mirrors The output shaft 3 of the motor 2 is operatively coupled to a mechanical clutch, generally indicated by 4, and including, for example, a contoured circular element of a resilient material, for example a spring steel.

The number 6 shows a first reducing unit, including, according to the invention, a planetary reducing element providing a high reducing ratio, for example larger than 1000. This can be achieved by an arrangement including three planetary gears, rotating about two ring gears, of different tooth numbers, for example with a 1-tooth difference.

The mechanical clutch element 4 and first reducing unit are housed at first in a correspondingly contoured ring 7, in turn housed in a housing sleeve 8 of a middle support 9, on the base surface 11 of which is likewise formed a bell housing 12, including a sleeve pinion 13 of a second reducing unit 14, further comprising a worm screw 16 which can be engaged with an inner thread 17 of the pinion element 13, having pinion teeth 18. In the assembled condition, a gear wheel 19 meshes both with the pinion rings 18 and with the output pinion 25 of the first reducing unit 6. The number 22 shows the active end of the worm screw element 16, which end 22 is operatively engaged with the rod 23 of the element 24 cooperating with the shutter device, not shown, inside the valve or manifold fitting, also not shown.

The number 26 shows a support base, to which the middle support 9 can be affixed, for example by a snap type of engagement of perimetrically arranged hook teeth 27. As shown in FIG. 1, the middle support 9 and support base 26 are formed with a plurality of recesses housing the components of the first and second reducing units 6 and 14, and the contoured ring 7, housing the clutch element 4 and motor 2, the assembly being properly located by the cage or cartridge element 29 including four legs 31 having end contoured teeth 32 for snap engaging in corresponding recesses, not shown, formed in the support base 26.

In the example of FIG. 1, moreover, with the supporting base 26 an annular adapted 33 is likewise snap engageable, said annular adapter 23 having two diametrically opposite hook portions 34 for bridging the diametrically opposite lugs 36, of the element 24 to be coupled to the shutter mechanism to be driven.

By providing a given number of correspondingly contoured adapters, it is possible to connect the improved actuator according to the invention to a like number of, for example, manifolds of different makers.

Finally, the reference number 37 shows a circuit card supporting the components and circuitry for programmably controlling the motor, or actuator. This controlling electronics is not herein disclosed in further details since it can be easily designed by those skilled in the art; this is also true for the related programming or setting components, which can be correspondingly easily designed by those skilled in the art, to be assembled, for example, on the covering cap 38, for controlling an individual valve, or to be arranged a given distance from a manifold or the like.

Thus above mentioned supporting framework, substantially comprises the cartridge element 29, middle support 9, support base 26 and covering cap 38.

The reference number 39 shows a top end portion of the worm screw 16, projecting from the bell housing 12 and adapted to operate as a position displaying element or index, visually showing the position of the shutter, for example the closing, opening or middle position thereof. This is achieved, for example, by suitably coloring the ends 39 and providing a corresponding mirror through the covering cap 39; or the cap can be at least partially, or at a region thereof, clear.

According to the invention, moreover, said top end 39, or other portion of the worm screw element 16, can advantageously operate also as a driving element for driving a limit switch, not shown.

The power supply can indifferently be a battery power supply, the batteries of which are for example housed in the covering cap 38, or supported at a spaced position, or a D.C. power supply, as is broadly known for power supplying driving electronic cards and electric components. As the motor 2 is power supplied, it rotatively drives the first reducing unit 6, through the mechanical clutch arrangement 4, the output pinion 21 of said first reducing unit 6 in turn rotatively driving the second reducing unit 14, and, in dependence on the rotary direction of the motor 2, the worm screw 16 will being axially driven either upward or downward. This up/down movement of the worm screw element 16 likewise causes a corresponding up/down movement of the shutter, not shown, with a consequent displacement through the overall opening and closing stroke thereof, or vice-versa.

In operation it has found that, prior miniaturized D.C. small motors, for example of a type used in motor vehicle rear mirrors, absorb or drain a power less than 0.6 W, i.e. eight times less than that drained by prior thermoelectric actuators. By these small motors and the two reducing units according to the present invention, of which the first is of planetary type and advantageously comprises three planetary gears rotating about two gear wheels with a difference of 1 tooth from one another, a high reduction ratio, larger than 1000, with a diameter less than 15 mm, is obtained. Moreover, by the second reducing unit operating as a movement transformer, i.e. transforming a rotary movement into an axial movement, by a threaded type of engagement, the improved actuators according to the invention allow to easily overcome shutter springing reacting forces greater than 15 Kg.

In this connection it should be apparent that the shutter reciprocating time, i.e. the adjustment time, is very short, fully independent from the environment conditions and free of inertial delays, which amounts to several minutes in prior thermoelectric actuators. This provides a great power saving.

Moreover, the improved actuators according to the invention can be advantageously driven by several recently designed adjustment systems, such as PI adjusting devices, (i.e. proportional-integral adjusting device), time modulation adjusting devices, and fuzzy logic based self-adapting adjusters. Moreover, since the flow rate of heating/cooling systems can be easily adjusted, it is possible to substantially improve the performance and efficiency of said systems, from the power consume and environmental aspect standpoints, i.e. depending on a plurality of requirements through an overall operating day.

Advantageously, moreover, the provision of a mechanical clutch prevents the motor from being locked as its end of stroke or limit positions, which greatly reduces the stresses applied to the motor, thereby a very long operating life, greater than ten years, can be easily achieved.

Owing to the disclosed constructional arrangement, and the provision of reducing unit components made of a synthetic material, a noiseless operation and low costs can moreover be achieved, which, together with a synthetic material constriction of the portions of the support framework and covering cap, and low cost of the commercially available miniaturized D.C. motors, provides, on a side, a making cost substantially like that of prior thermoelectric actuators and, on the other hand, a very small size actuator, which can be easily installed even on manifolds having shutters with a pitch less than 50 mm.

From the above constructional and operating disclosure, it should be apparent that the improved actuators according to the present invention efficiently achieve the above mentioned aims, objects and advantages.

In practicing the invention, those skilled in the art can easily carry out modifications and variations, for example related to the arrangement of the reducing units and so on, and freely choose the materials for the actuator components, and specifically designed control cards or program settings, without departing from the scope of the invention.

What is claimed is:

1. An improved actuator for water heating/cooling and sanitary systems, including a driving motor and a related reducing unit operating on a spring preloaded shutter driving a component such as a valve, manifold or the like, characterized in that said actuator comprises, in a support framework,
    a) an electric motor comprising a miniaturized D.C. motor,
    b) a first reducing unit comprising a planetary reducing unit providing a high reduction ration,
    c) a second reducing unit arranged between the first reducing unit and an element operatively associated to the shutter, said second reducing unit including a worm screw for transforming a rotary movement into an axially reciprocating movement,
    d) a mechanical clutch element, operatively arranged between an output of said D.C. motor and an inlet of said first planetary reducing unit,
    e) an electronic control card for controlling and driving said D.C. motor depending on a presettable heating/cooling program, and
    f) mechanic coupling means for coupling to said valve, manifold or the like, including the shutter to be driven, and
        characterized in that said second reducing unit comprises a driving gear wheel and a second gear wheel or pinion having an inside threaded sleeve and housing with a threading engagement a worm screw element to transform a rotary movement into an axial reciprocating movement, wherein said worm screw element has an end operatively cooperating with a rod, or the like, of the shutter driving element.

2. An improved actuator according to claim 1, characterized in that said miniaturized D.C. electric motor comprises a D.C. small motor having a power drain less than 1 W, preferably less than 0.6 W, and with an outer diameter equal to or less than 15 mm.

3. An improved actuator according to claim 1, characterized in that the first planetary reducing unit provides a reduction ratio greater than 1000, and that said first planetary reducing unit comprises three planetary gears rotating about two gear rings, said gear rings having a different number of teeth, preferably one of said gear ring having 1 tooth less than the other gear ring, to provide a different RPM.

4. An improved actuator according to claim 1 characterized in that said worm screw element has, at a top thereof, a further end visually projecting from a bell housing support and operating as a visual element for visually indicating the position of said shutter and/or as a limit switch driving element.

5. An improved shutter according to claim 1, characterized in that said shutter comprises a support framework including a middle support supporting said first reducing unit with said mechanical clutch and said second reducing unit, a support base which can be coupled to said middle support, and a cage element having legs which can be plugged in said support base for protecting said electric D.C. motor.

6. An improved actuator according to claim 1, characterized in that it comprises a covering cap which can be coupled, preferably in a removable manner, for example by a snap type of engagement, to said actuator support framework.

7. An improved actuator according to claim 6, characterized in that said covering cap is made, at least at a region thereof, of a clear material to detect a position of a signaling element indicating the instantaneous position of said shutter.

8. An improved shutter, according to claim 1, characterized in that said mechanical coupling means for coupling to said valve, manifold or the like, comprise a plurality of differently arranged adapters each of which can be coupled to a valve, manifold or the like of a desired maker.

9. An improved actuator for water heating/cooling and sanitary systems, including a driving motor and a related reducing unit operating on a spring preloaded shutter driving a component such as a valve, manifold or the like, characterized in that said actuator comprises, in a support framework, a) an electric motor comprising a miniaturized D.C. motor, b) a first reducing unit comprising a planetary reducing unit providing a high reduction ration, c) a second reducing unit arranged between the first reducing unit and an element operatively associated to the shutter, said second reducing unit including a worm screw for transforming a rotary movement into an axially reciprocating movement, d) a mechanical clutch element, operatively arranged between an output of said D.C. motor and an inlet of said first planetary reducing unit, e) an electronic control card for controlling and driving said D.C. motor depending on a presettable heating/cooling program, and f) mechanic coupling means for coupling to said valve, manifold or the like, including the shutter to be driven, and characterized in that said shutter comprises a support framework including a middle support supporting said first reducing unit with said mechanical clutch and said second reducing unit, a support base which can be coupled to said middle support, and a cage element having legs which can be plugged in said support base for protecting said electric D.C. motor.

10. An improved actuator according to claim 9, characterized in that it comprises a covering cap which can be coupled, preferably in a removable manner, for example by a snap type of engagement, to said actuator support framework.

11. An improved actuator according to claim 10, characterized in that said covering cap is made, at least at a region thereof, of a clear material to detect a position of a signaling element indicating the instantaneous position of said shutter.

12. An improved shutter, according to claim 9, characterized in that said mechanical coupling means for coupling to said valve, manifold or the like, comprise a plurality of differently arranged adapters each of which can be coupled to a valve, manifold or the like of a desired maker.

* * * * *

UNITED STATES PATENT AND TRADEMARK OFFICE
CERTIFICATE OF CORRECTION

PATENT NO. : 6,777,840 B2  Page 1 of 1
DATED : August 17, 2004
INVENTOR(S) : Luca Giacomini It is certified that error appears in the above-identified patent and that said Letters Patent is hereby corrected as shown below:

<u>Title page,</u>
Below Item [87], please insert Item [30] to read as follows:

-- [30]  Foreign Application Priority Data

April 6, 2000     (IT)……………..MI2000A000732 --.

Signed and Sealed this

Twenty-first Day of December, 2004

JON W. DUDAS
*Director of the United States Patent and Trademark Office*